(12) United States Patent
Doering et al.

(10) Patent No.: US 6,204,965 B1
(45) Date of Patent: Mar. 20, 2001

(54) MICROSCOPE WITH TABLE DEVICE

(75) Inventors: Gerhard Doering, Schloeben; Matthias John, Kleinpuerschuetz; Rolf-Gero Rau, Jena, all of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/309,221

(22) Filed: May 10, 1999

(30) Foreign Application Priority Data

Dec. 5, 1998 (DE) .......................................... 298 21 695 U

(51) Int. Cl.[7] .............................. G02B 21/26; G02B 21/00

(52) U.S. Cl. .......................... 359/393; 359/368; 359/385; 359/392

(58) Field of Search ...................................... 359/368, 363, 359/379–380, 382–385, 388–389, 391–394; 250/201.3, 203.6, 307, 310, 397, 442.11, 548

(56) References Cited

U.S. PATENT DOCUMENTS

| | | | |
|---|---|---|---|
| 4,443,008 | * | 4/1984 | Shimano ................................ 272/73 |
| 4,821,056 | * | 4/1989 | Shinoda et al. ......................... 396/60 |
| 5,684,627 | * | 11/1997 | Ganser et al. ......................... 359/383 |

FOREIGN PATENT DOCUMENTS 6-138395 * 5/1994 (JP) ...................................... 359/392

* cited by examiner

*Primary Examiner*—Thong Nguyen
(74) *Attorney, Agent, or Firm*—Reed Smith LLP

(57) ABSTRACT

A microscope is disclosed with a stage which is adjustable in coordinates X, Y and/or Z, with a drive for stage adjustment and with a control circuit for presetting different adjusting speeds. In a microscope of the type mentioned above, a device is provided for showing the given adjusting speed during the adjustment of the stage in at least one of coordinates X, Y, Z. Therefore, it is advantageously possible during the adjustment and/or programming of the microscope to visually perceive the adjusting speed or to display speed gradations which are not otherwise detectable in the eyepiece.

4 Claims, 1 Drawing Sheet

MICROSCOPE WITH TABLE DEVICE

BACKGROUND OF THE INVENTION a) Field of the Invention

The invention is directed to a microscope with a table or stage which is adjustable in coordinates X, Y and/or Z, with a drive for stage adjustment and with a control circuit for presetting different adjusting speeds.

b) Description of the Related Art

In optical precision instrument engineering, all-purpose routine microscopes outfitted with electromechanically driven functional components are known. Microscopes of this type have, for example, a high-precision positioning device for stage focusing, a motorized condenser function, coded specimen and reflector turrets, an objective-dependent brightness control coupled with the objective turret, an automatic balancing of focusing speed and focusing position of the utilized objectives and, if necessary, also the possibility of linking the microscope to a PC via a RS232 interface.

A construction of this kind corresponds, for example, to the Zeiss microscope known under the brand name "Axioskop 2 MOT". In addition to the above-mentioned equipment, an LED line is provided in this case for displaying the brightness adjusted in transmitted-light operation. The operating voltage applied to the light source is used as a quantity proportional to the brightness in order to show the adjusted brightness; the higher the operating voltage, the more LEDs are illuminated in the LED line.

The stage adjustment can be carried out at different speeds for stage focusing when changing objectives depending on the programming of the sequence. It is disadvantageous in microscopes of this type that there is no display available to show the speed at which the stage adjustment is carried out. This deficiency becomes noticeable particularly when programming the microscope for different applications and operating modes. Accordingly, it is difficult to reproduce values of the adjusting speed that have already been adjusted. Also, fine speed gradations which can not be detected visually through the eyepiece are difficult to distinguish.

OBJECT AND SUMMARY OF THE INVENTION

Against this background, it is the primary object of the invention to further develop a microscope of the type described above in such a way that adjustment and/or pre-programming is further facilitated with respect to different cases of application and operating modes.

According to the invention, means are provided in a microscope of the type mentioned above for showing the preset adjusting speed during displacement of the stage in at least one of coordinates X, Y, Z.

Therefore, it is advantageously possible during the adjustment and/or programming of the microscope to visually perceive the adjusting speed or to display speed gradations which are not otherwise detectable in the eyepiece.

In a particularly preferred construction of the invention, in a microscope which is outfitted with a light source for transmitted light operation and/or reflected light operation, with a control circuit for presetting different brightnesses for this light source and with a display device for showing the respective preset brightness, this display device is provided for showing the respective preset brightness as well as for showing the respective preset adjusting speed. For this purpose, according to the invention, the display device is connected in a selectable manner with the control circuit for the stage drive or with the control circuit for the light source by a switchover device.

The advantage of the invention can be achieved with virtually no additional technical expenditure in that the display device that is already present for displaying lamp brightness is also utilized for displaying the adjusting speed of the stage. The display device is preferably used to display the speed of the stage adjustment in the focusing direction, i.e., for adjusting the stage in coordinate Z.

As a rule, microscopes of this type are outfitted with a device for selecting the mode of operation by which, among other things, the microscope can be switched from programming operation to microscope operation, and vice versa. According to the invention, it is provided in microscopes of this type that the switchover device for selectable use of the display device is integrated in the operating mode selector or is at least linked with the latter such that the display device is connected with the control circuit for the stage drive in the programming operating mode and with the control circuit for the light source in the microscope operating mode.

In this way, it is advantageously accomplished, without the need for additional manipulation, that the adjusted adjusting speed of the stage is displayed on the display device in the programming mode, while information about the adjusted lamp brightness, which is more important for the user in the microscope mode, can be read off in this mode.

As is well-known, a display device of this type can comprise an LED line in which, for example, the quantity of LEDs at a high signal level increases as the operating voltage given for the light source increases. In an analogous manner, according to the invention, it is provided that after the switching over or the linking of the display device with the control circuit for the stage drive, the number of LEDs in the LED line which are at the high signal level and which are illuminated increases as the operating voltage given for the stage drive increases. In this case, the given operating voltage serves as an equivalent for the adjusting speed of the stage.

Of course, it is also possible to provide an arrangement with a plurality of individual LEDs which are used together as a so-called bar display instead of an LED line constructed as a compact component, wherein the quantity of lit or unlit LEDs represents a measure for the adjusting speed as in the case of the LED line.

The LEDs can be triggered by a high signal level as well as by a low signal level (or negative high). The decisive factor in this respect is that the operating voltage is an equivalent for the quantity of illuminated LEDs.

Accordingly, depending on the arrangement of the invention in programming mode or, as the case may be, also in microscope mode, sufficiently accurate information on the given adjusting speed of the stage is made available to the user of the microscope.

In another very preferable construction of the invention, a microprocessor is provided for programming the stage drive and for controlling the light source and the LED line, which microprocessor is connected on the input side with the operating mode selector which is outfitted, for example, with a keypad or keyboard.

The invention will be explained more fully hereinafter with reference to an embodiment example.

BRIEF DESCRIPTION OF THE DRAWING

The solution according to the invention is shown schematically in the accompanying drawing FIG. 1.

DESCRIPTION OF THE PREFERRED EMBODIMENTS

Figure 1:
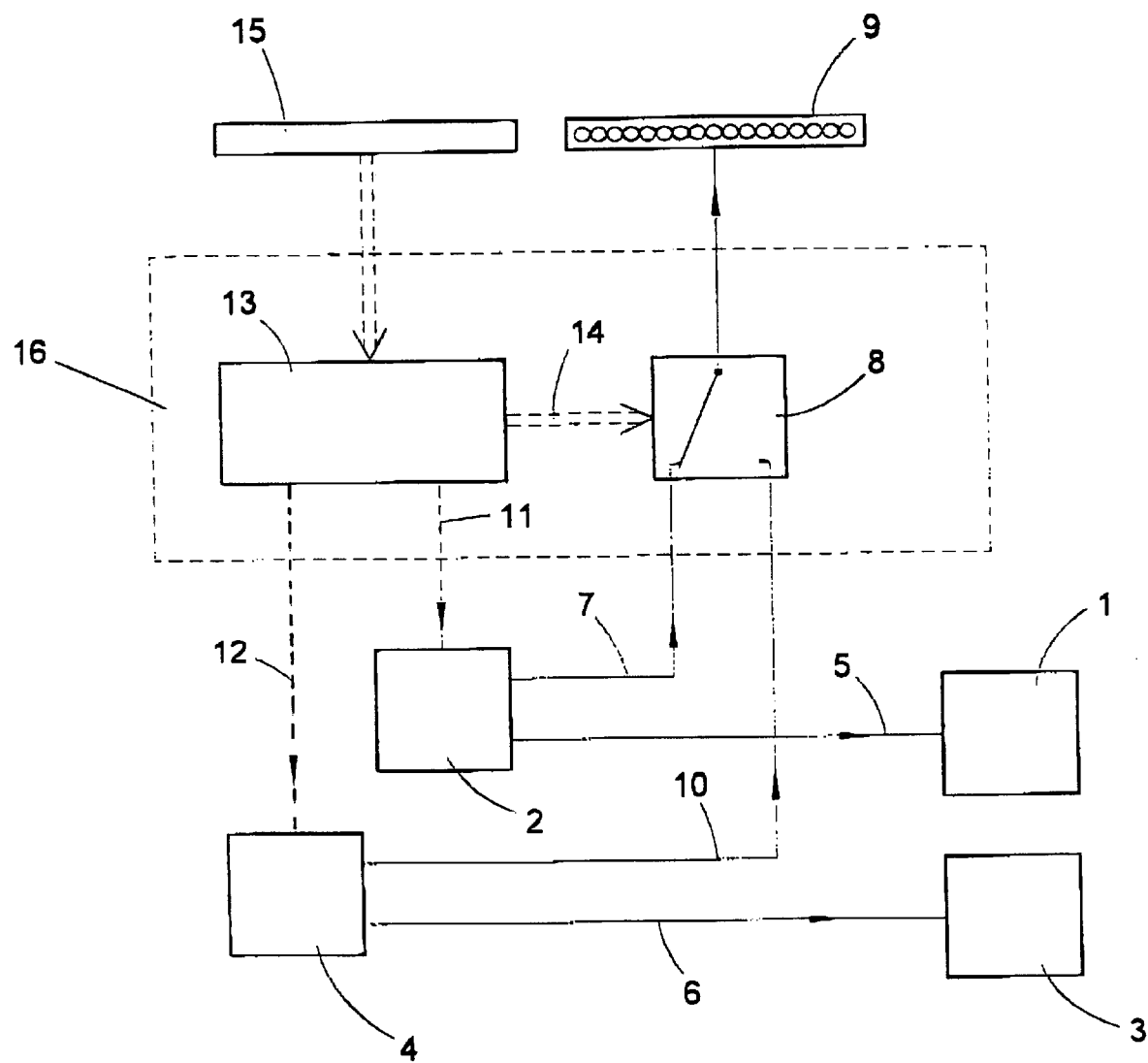

It will be seen that a stage drive 1 is connected with a control circuit 2 for stage adjustment and a light source 3 is connected with a control circuit 4 for presetting the brightness of the light source 3. It is assumed in this case that the stage drive 1, light source 3 and control circuits 2 and 4 are configured and adapted to one another in such a way that the operating voltages made available by the control circuits 2, 4 are equivalents for the adjusting speed of the stage and for the brightness of the light source 3, respectively. This dependency preferably corresponds to a linear function.

Accordingly, the operating voltage for the stage drive 1 is applied via a supply line 5 and the operating voltage for the light source 3 is applied via supply line 6. The control circuits 2 and 4 can be integrated in a power supply unit, for example.

The control circuit 2 is further connected with an LED line 9 by a signal path 7 and a switchover device 8. Similarly, control circuit 4 is connected with the same LED line 9 by a signal path 10 and by the same switchover device 8.

The drawing also shows an operating mode selector 13 which is connected with a control input of the control device 2 via a signal path 11 and with a control input of the control circuit 4 via a signal path 12. The control input 14 of the switchover device 8, by means of which the switching over can be initiated, is linked with the operating mode selector 13. A keypad 15 which is connected with the operating mode selector 13 is provided for selecting the different operating modes.

In a particularly preferred construction, the operating mode selector 13 and the switchover device 8 are realized by means of a microprocessor 16. The individual operating modes and the corresponding actuating commands for control circuits 2 and 4 and for switchover device 8 are established by suitable programming of the microprocessor 16, wherein the individual programs can be called up by actuating the keypad 15.

If the microscope is to be operated in programming mode, for instance, an appropriate command is sent to the operating mode selector 13 by actuating the keypad 15. Actuating commands are likewise sent to the control circuits 2 and 4 by presetting via the keypad 15, as a result of which the appropriate operating voltages are made available, depending on the intended application of the microscope, for the stage drive 1 via supply line 5 and for light source 3 via supply line 6.

At the same time that the programming mode is set, the operating mode selector 13 ensures that the switchover device 8 (which may be realized by a microprocessor function, if necessary) connects signal path 7 with the LED line 9, as is shown, by sending an actuating command to the switchover device 8 via signal path 14.

Accordingly, a signal level which is proportional to the operating voltage applied to the stage drive 1 is present at the LED line 9 via signal path 7 and switchover device 8. A number of diodes equivalent to this operating voltage are illuminated at LED line 9.

When the adjusting speed of the stage is changed by means of a corresponding input in the keypad 15, this results not only in a change in the operating voltage applied to the stage drive 1, but also changes the signal level applied to the LED line 9 via signal path 7, so that, depending on whether the operating voltage is increased or decreased, a larger or smaller number of light emitting diodes inform the user of the microscope about the adjusting speed of the stage.

If the adjusting speed of the stage is changed continuously, a continuous increase or decrease in the quantity of illuminated LEDs corresponds to this continuous change.

When the programming mode is terminated by a corresponding input via the keypad 15 and the microscope is switched over to the microscope mode, the signal path 7 is also separated from the LED line 9 at the same time by actuating the switchover device 8 and the LED line 9 is coupled instead to signal path 10. Therefore, while in the microscope mode, a signal level which is equivalent to the operating voltage supplied to the light source via supply line 6 is applied to LED line 9 via signal path 10.

If an increase or reduction in the brightness of the light source 3 is initiated by raising or lowering the operating voltage through input at the keypad 15 or automatically based on the pre-programmed microscope operation, the signal level present at the LED line 9 also changes in the same way, so that the higher the selected operating voltage, the more LEDs light up and the user is informed of the adjusted brightness. A commercially available component assembly can be used as an LED line.

Alternatively, it is also possible to change the speed progressively during the adjustment of the stage, for example, in five predetermined steps, and to assign a determined quantity of LEDs to each of these steps. Accordingly, for example, if three LEDs are associated with each speed step, three additional LEDs light up when switching over from one speed step to the next higher speed step, and vice versa.

While the foregoing description and drawings represent the preferred embodiments of the present invention, it will be obvious to one skilled in the art that various changes and modifications may be made therein without departing from the true spirit and scope of the present invention.

REFERENCE NUMBER 1 stage drive
2 control circuit
3 light source
4 control circuit
5, 6 supply line
7 signal path
8 switchover device
9 LED line
10, 11, 12 signal paths
13 operating mode selector
14 control input
15 keypad
16 microprocessor

What is claimed is:

1. A microscope with a stage which is adjustable in at least one of X, Y and Z coordinates comprising:
    a light source for transmitted light operation and/or reflected light operation of the microscope;
    at least one stage drive for stage adjustment;
    control circuit for presetting different adjusting speeds;
    a control circuit for presetting different brightnesses for the light source;
    a display device for showing respective preset brightness and for showing respective adjusting speeds in at least one of coordinates X, Y and Z;
    said display device being connected in a selectable manner with the control circuit for the stage drive or with the control circuit for the light source by a switchover device; and an operating mode selector for operation of the microscope in programming mode or in microscope mode, wherein said switchover device is connected with the control circuit for the stage drive in the programming mode and with the control circuit for the light source in the microscope operating mode.

2. The microscope according to claim 1, wherein an LED line is provided as display device and a voltage potential equivalent to an operating voltage for the light source or a voltage potential equivalent to the operating voltage for the stage drive is applied to the LED line.

3. The microscope according to claim 2, wherein the number of LEDs in the LED line which are at the high signal level and which are illuminated increases as the given operating voltage increases.

4. The microscope according to claim 2, wherein a microprocessor is provided for controlling the stage drive, the light source and the LED line, which microprocessor is connected on an output side with the operating mode selector.

* * * * *